US008316021B2

(12) United States Patent
Monteverde

(10) Patent No.: US 8,316,021 B2
(45) Date of Patent: Nov. 20, 2012

(54) METHODS AND SYSTEMS FOR ENHANCED PLACEMENT SEARCH ENGINE BASED ON USER USAGE

(75) Inventor: Dante Monteverde, Barrington Hills, IL (US)

(73) Assignee: Emergency 24, Inc., Chicago, IL (US)

( * ) Notice: Subject to any disclaimer, the term of this patent is extended or adjusted under 35 U.S.C. 154(b) by 0 days.

(21) Appl. No.: 12/827,704

(22) Filed: Jun. 30, 2010

(65) Prior Publication Data

US 2012/0005181 A1    Jan. 5, 2012

(51) Int. Cl.
G06F 17/30    (2006.01)

(52) U.S. Cl. ...................................................... 707/734

(58) Field of Classification Search .................. 707/748, 707/732, 733, 734
See application file for complete search history.

(56) References Cited

U.S. PATENT DOCUMENTS

| | | | | |
|---|---|---|---|---|
| 6,507,841 B2 * | 1/2003 | Rivereiulx de Varax | ............. | 1/1 |
| 7,062,561 B1 * | 6/2006 | Reisman | ........................ | 709/227 |
| 7,660,792 B2 * | 2/2010 | Brewer et al. | .................... | 726/22 |
| 7,707,220 B2 * | 4/2010 | Bonabeau et al. | ............ | 707/758 |
| 7,716,217 B2 * | 5/2010 | Marston et al. | ................ | 707/728 |
| 7,734,631 B2 * | 6/2010 | Richardson et al. | .......... | 707/749 |
| 7,756,970 B2 * | 7/2010 | Ebert et al. | ...................... | 709/224 |
| 7,809,709 B1 * | 10/2010 | Harrison, Jr. | ................. | 707/707 |
| 7,827,170 B1 * | 11/2010 | Horling et al. | ................ | 707/722 |
| 2002/0120609 A1 * | 8/2002 | Lang et al. | ......................... | 707/1 |
| 2004/0177138 A1 * | 9/2004 | Salle et al. | ..................... | 709/223 |
| 2005/0060230 A1 * | 3/2005 | Kaye | ............................... | 705/14 |
| 2005/0071328 A1 * | 3/2005 | Lawrence | .......................... | 707/3 |
| 2005/0154688 A1 * | 7/2005 | Bolt et al. | ........................ | 706/14 |
| 2008/0033970 A1 * | 2/2008 | Jones et al. | ................... | 707/100 |
| 2008/0059453 A1 * | 3/2008 | Laderman | .......................... | 707/5 |
| 2008/0082528 A1 * | 4/2008 | Bonzi et al. | ........................ | 707/5 |
| 2008/0114739 A1 * | 5/2008 | Hayes | ................................ | 707/3 |
| 2009/0006324 A1 * | 1/2009 | Morris et al. | ...................... | 707/3 |
| 2009/0216760 A1 * | 8/2009 | Bennett | ............................. | 707/5 |
| 2011/0066607 A1 * | 3/2011 | Wong | ............................ | 707/706 |

* cited by examiner

Primary Examiner — Jorge A Casanova
(74) Attorney, Agent, or Firm — Seyfarth Shaw LLP

(57) ABSTRACT

Systems and methods for search engines are disclosed wherein the search engine results and the information on which such are based are altered based on users specifically providing feedback to the search engine the appropriateness of one or more of the search results provided in response to a search query made by the user to the search engine. Therefore, the search engine is a dynamic and evolving ranking system for determining search results to be displayed to users in response to a search query.

14 Claims, 2 Drawing Sheets

METHODS AND SYSTEMS FOR ENHANCED PLACEMENT SEARCH ENGINE BASED ON USER USAGE

FIELD OF THE INVENTION

The invention relates to search engines and, in particular, to search results of Internet-based search engines wherein the search results are based on usage of specific links or results.

BACKGROUND

Currently, one of the highest-valued Internet or Web-based utilities is the basic search engine. Many of the largest Internet-only companies rely on search activity to generate their largest amount of traffic and, thus, revenues.

There are many methods for producing a set of search results from a query input to a search engine, typically via an interface of a web browser. For the sake of convenience, the individual entries in the set of results are referred to as links herein. Some of these methods are proprietary, some are secret, some are simple, and others are quite complex. However, there are two basic manners in which the links are collected, those being through the use of specialized applications that seek out webpages (known as crawlers or spiders) and through manual input or identification of the links which often occurs by a website seeking to be included in a search engine's results. In the latter of these cases, the website operators may pay a fee in order to be in a section of sponsored links, or to receive a preferred ranking within the search result list.

In response to a query, the search results are displayed on the browser of the user who input the query. While the algorithms for various search engines may vary, a common manner for selecting the search results from the databases of the engine is identifying the relevance of the search query to information contained in the webpage, such information previously having been collected. For instance, if a search query has a single word, the links produced by the engine would likely have a high usage of that word in the page to which the link directs.

Such engines are susceptible to manipulation by website operators. A website operator may generate revenue from advertising on the webpages of the website simply by virtue of hits or views of the webpage. Accordingly, an unscrupulous website operator may employ a variety of tactics to generate views of the webpage, regardless of whether the webpage is truly targeted by the user's search query.

As stated before, the engine collects information from the identified webpages. A portion of this information is legitimately related to the useful contents of the webpage, such that identification of a website based on the search query is also useful to the searching user; however, some is not. The actual forms of worthless information, such as metatags or text that does not appear to a user (which can be done by reducing font size or by matching text color with background color, or by hiding the text behind a graphic), is not important. What is important is that such practices can result in a number of the links returned in response to a search query being based on this worthless information and, thus, the webpage is of little to no use to the searching user.

Accordingly, there has been a need for improved methods and systems with which to identify the validity and utility to actual users of search results provided by an Internet-based search engine as a result of a search query.

SUMMARY

In accordance with an aspect, a web-based computer system search engine for receiving search queries and returning search results is disclosed including an input for a search query, the input displayed on a webpage of a browser provided at a remote computer by a user, a processor for receiving the search query from the user computer, and a storage for storing correlated websites, links, and information relevant to the content of the websites, wherein the system produces a results webpage for display on the user computer in response to the search query, the results webpage including links listed according to a ranking of relevance to the search query, the results webpage further including a user feedback input for the user to provide feedback information relevant to the accuracy of the links to the search query.

In some forms, the processor receives the user feedback information and alters the information in the storage at least in part based on the user feedback information.

In some forms, the feedback input includes a numerical ranking of relevance.

In some forms, the feedback input includes a comment input.

In some forms, the feedback input includes a quality input describing the quality of the website to the user.

In some forms, the processor receives the user feedback information and compares user feedback information received from a plurality of users.

In another aspect, a method of dynamically ranking search results relative to a search query is disclosed including the steps of providing a search engine including a storage portion including information relevant to identified websites, and including and a processing portion, displaying a search engine interface webpage on a user computer, receiving a search query from the user via the interface webpage, processing, via the processing portion, the search query to determine a ranked set of results from the storage portion, displaying at least a portion of the ranked set of results as a results webpage on the user computer, receiving feedback input from the user relevant to the appropriateness of one or more displayed search results, and altering the information in the storage portion relevant to the search results for which the user provides feedback.

In some forms, the step of altering the information includes aggregating information received from a plurality of users.

In some forms, the step of displaying a portion of the ranked set of results includes displaying feedback inputs on the results webpage.

In some forms, displaying feedback inputs includes presenting one or more of a ranking input for receiving a numerical ranking, a comment input for receiving a text comment, and a quality input for receiving a quality ranking from the user.

In some forms, the method includes the step of aggregating feedback information from a plurality of users, and the step of altering includes altering the storage information based on the aggregate feedback information.

DETAILED DESCRIPTION

In general terms, the present invention utilizes a dynamic and evolving ranking system for determining search results to be displayed to users in response to a search query. More specifically, the present invention utilizes user behavior, after the search results are delivered, as a proxy for which search results are the most valid and useful for the user. In general, the invention is not concerned with how a search result was identified as an initial matter: that is, the invention seeks to remove the improperly returned search results while maintaining the appropriate results. Ultimately, the search results are objective-based, being displayed because users found the results to be useful, as opposed to the conventional approach of being based on text in titles and descriptions and backgrounds.

In greater detail, one form of the present invention encompasses deliberate action by search users to facilitate the dynamic evolution of search results.

Figure 1:
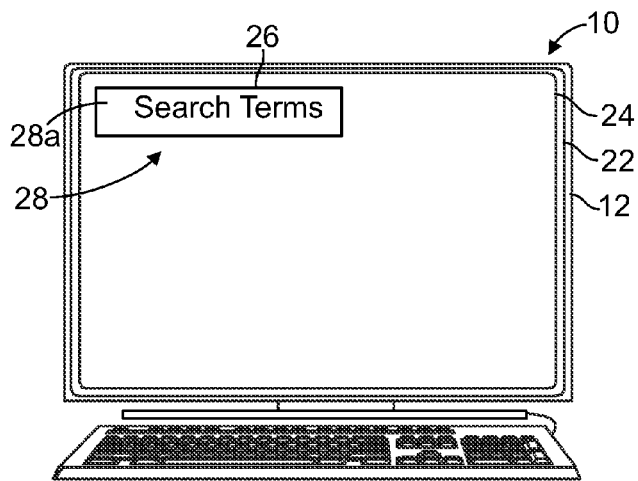
FIG. 1 is a representative view of a conventional web browser presented to a user on a computer monitor, the web browser displaying a search engine interface including an input box.

Referring initially to FIG. 1, a computer 10 including a monitor 12 is utilized by a user (not shown) to select a computer and web-based search engine 20, typically via a web browser 22. The search engine 20 responds by delivering a webpage in the form of a search page 24, the webpage being delivered as one or more computer files that are displayed in the browser 22 and on the monitor 12. The search page 24 has an input box 26 for receiving terms 28a of a search query 28. Such is a basic approach, and it is recognized that other forms may be used such as an input box in a toolbar of a webpage, by way of mere example.

Figure 4:
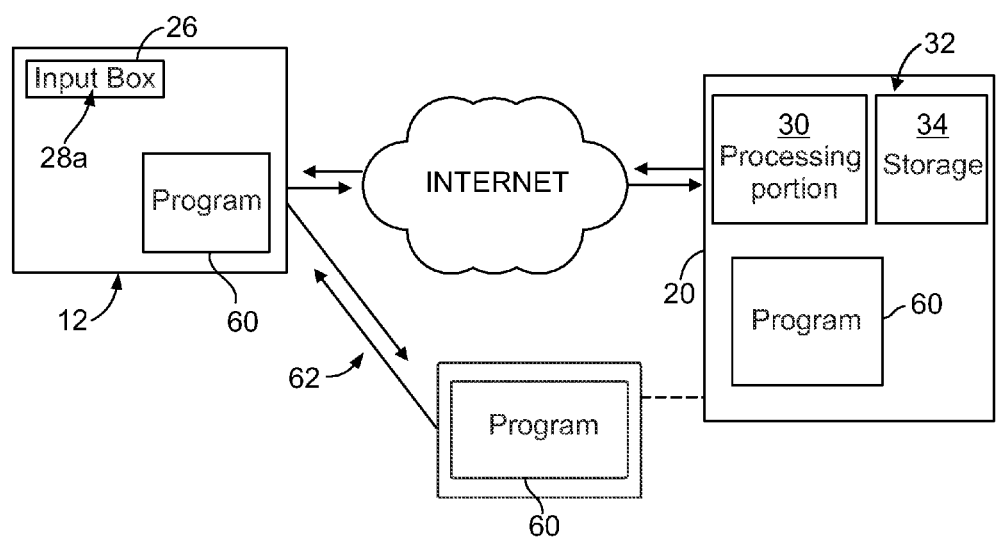
FIG. 4 is a graphical illustration of a system of the present invention.

Turning to FIG. 4, the user inputs the terms 28a, as is conventionally known. The terms 28a are then transmitted (via the Internet, for example) to a processing portion 30 of the search engine 20. The search engine 20 includes one or more storage portions or databases 32 which have stored therein information 34 that has been collected as representative of various web pages and sites. The processing portion 30 compares the terms 28a to the information 34, thus resulting in both a list of sites that have information 34 that appears relevant to the terms 28a and a ranking 36 for each of those sites.

The search engine 20 returns a set 40 of results or links 42 to the browser 22 for display thereon. The set 40 of links 42 may include a link or links 42a for sites determined to have information 34 that appears relevant and a link or links 42b for sites that have been purchased a high ranking or paid to be sponsor links. In most cases, the set 40 of results sent to the browser 22 is a subset of all the sites that may be relevant, such as the highest ranked search results. Upon subsequent request(s), a user may receive additional subsets of links that are lower-ranked than the previously displayed results.

Figure 2:
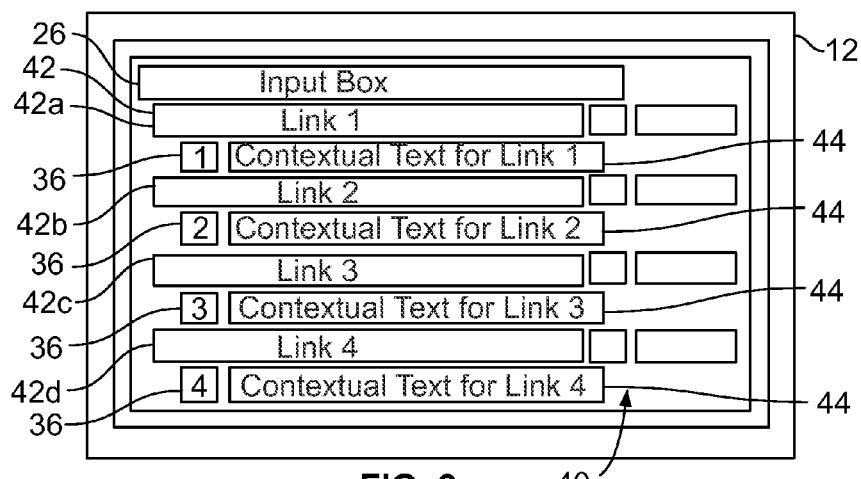
FIG. 2 is a representative view of the computer monitor and web browser of FIG. 1 displaying a set of search results in the web browser, the search results including a series of links, the search results being displayed in response to a particular search query.

FIG. 2 shows one such set 40 of links 42. Each link 42 may be paired with some text 44 from the webpage to which the link 42 directs so that the user can see the context in which the search terms 28a appear. The user typically considers this text 44 in deciding whether to follow a particular link 42 or not.

The present invention presents the user with the ability to provide feedback on the individual links 42. That is, the search user may review a plurality of the links 42 and explore the sites to which they lead. The user then can decide which links 42 lead to useful sites and which links 42 do not, or degrees therebetween.

As an example, a user may perform a search that results in the set 40 of FIG. 2. It may be immediately apparent that a number of the links 42 are not appropriate. By way of illustration, someone may search for "prime" and "loan" and a link for a "Prime Steak" website may be returned with the accompanying text of "loan a friend the money to eat here." A user can input back to the search engine 20 that such a results should be lowered in ranking.

The user may continue to review the results by individually selecting and reviewing a number of the links 42. The user may spend a significant amount of time on a particular website, only to conclude that the website was ill-suited for the search request. The user may spend a very brief period of time at a website and determine that the site provided the exact answer that was sought. A user may visit a second site to validate information provided by another site. In each of these cases, it is somewhat counter-intuitive to view the activity as indicating that the sites were appropriate and somewhat "best-in-class" for a particular search query. Therefore, the user is able to report such, and the search engine 20 uses the feedback information to revise the ranking of the results.

It should be noted that the present invention may be used with the invention of concurrently filed and co-pending U.S. application Ser. No. 12/827,725, the entirety of which is incorporated by reference herein, which, briefly stated, describes monitoring of the user's search activity and post-query activity (such as how many pages are viewed from the link 42, how long the pages are viewed, whether subsequent searches are made, whether there is interaction between the user and the site (such as ordering a product or transmitting information to the website such a through a fill-in form or an email)) to dynamically adjust the rankings of links 42.

The search engine 20 uses the direct feedback information from the user to revise the ranking of the results. Therefore, the link 42 may be dropped or advanced in ranking and the information 34 stored in the database may be appended or otherwise altered to reflect this change.

Figure 3:
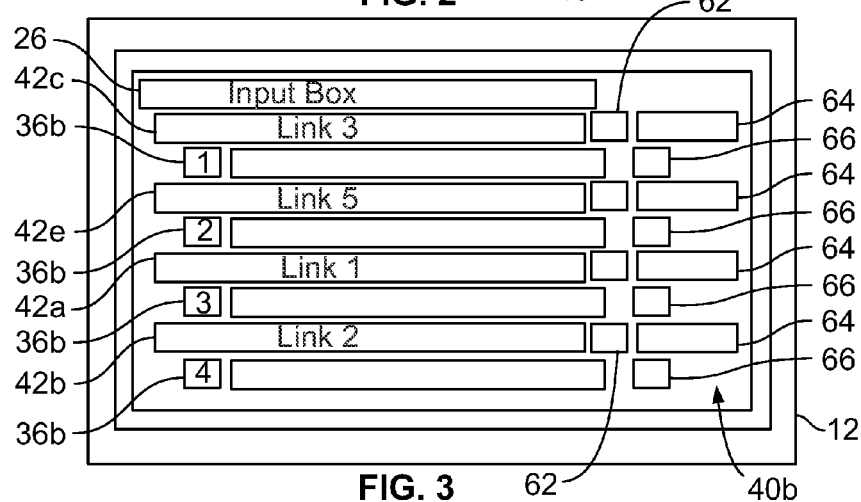
FIG. 3 is a representative view corresponding to FIG. 2, the search results being displayed in response to the particular search query of FIG. 3 at a subsequent time.

FIG. 2 may be compared with FIG. 3 to illustrate this dynamic shift in ranking. FIG. 2 shows search results 40, the first four links 42 according to ranking, returned in response to the search query 28. Accompanying each link 42 is the associated contextual text 44. In this representative view, a ranking score 36 is also displayed, though such need not be presented to the user and is presented here for illustrative purposes. FIG. 3 shows a set of results 40b at a subsequent time, four links 42 according to subsequent ranking scores 36b returned in response to the search query 28. As can be seen, link 42c has a higher ranking score 36 as a result of user activity such as users providing feedback that indicates the appropriateness of the link 42c, and link 42d (FIG. 2) does not appear in FIG. 3 as it failed to gain user approval or because users actively disapproved.

Additionally, link 42e appears for the first time in FIG. 3. Link 42e may be a link that was identified by a crawler of the engine 20 more recently than when the search of FIG. 2 was performed. Link 42e may also have been ranked out of the top twenty results as they appeared in FIG. 2, yet has been promoted to the top twenty based on user usage and feedback. Link 42e may also be a website identified by or to the operators of the engine 20, and the value of the link 42e is determined by the activity of real users, as described herein.

In still another form, a third party may have paid for a high ranking for link 42e, such as an initial top-twenty listing. In this form, the search engine 20 can receive compensation in the same manner as the engine 20 would from traditional sponsor links. The operation of the engine 20 (i.e., the feedback from users causing the processing portion 30 to act on the information 34 in the storage portion 32) determines future rankings 36 of all links 42, including sponsor links 42e. This pay-for-ranking feature is discussed in greater detail in concurrently-filed and co-pending U.S. application Ser. No. 12/827,738, the entirety of which is incorporated herein by reference.

In some forms, the engine 20 may operate under an established agreement with users. An agreement may be made between the operators of the engine 20 and users so that the users agree to provide information for the engine 20 use in dynamically revising the information 34 so that the search results returned are improved.

Towards this end, the users utilize either a browser 22 interface or overlay or the like to directly input information, referred to herein as program 60 and an exemplary form of which is illustrated in FIG. 4. In greater detail, the program 60 is to be running on the user's computer 10 prior to engaging in search activity. The user may run the program 60 by loading the program 60 from the engine 20 prior to each search and/or browser session, by loading the program 60 from a local drive (such as the hard drive of the computer 10) as an add-on to the browser 22, or may log on to a dedicated connection 62 (i.e., SSL) that hosts the program 60 the prior to and/or concurrent with utilizing the search engine 20.

When running, the program 60 collects all feedback from the user in a manner that is directly related to each search result in the form of the link 42. Other information may also be gathered, such as pages viewed from search results, amount of time spent viewing the pages, and the number of times a page is viewed. In the illustrated form, the search results 40 are displayed with a ranking input 62 and a comment input 64. The ranking input 62 may be one or more check boxes or radio buttons such as "Good Result? ☐" and "Bad Result? ☐," or may be provided with a drop down menu that has a series of numbers (i.e., 0-10) for ranking the site relative to the search query. The comment input 64 allows the user to provide specific feedback that can be viewed by other users or administrators, or that can be used by the algorithm of the processing portion 30 to revise the ranking. A third input 66 may be provided that indicates the quality of the result (link 42) in general, notwithstanding the appropriateness for the search term: for instance, one may discover a medical information site that the user finds exceptional, but did not find exceptional for the particular search query.

All feedback is considered in the aggregate. Therefore, a variety of factors may be considered in determining the dynamic ranking of a particular link 42. One factor is obviously the approval or individual collective rankings for a site based on a query. These factors may be correlated to the number of days that the link 42 was ranked above a certain cut-off (such as the top two pages of returned results), or the days since being collected into the storage portion 32. In some forms, the comment input 64 may allow the user to provide individual comments regarding advantages or disadvantages of a website, regarding prices (such as one that may indicate a high or low shipping cost for a particular retailer), or regarding other thoughts. In some form, the program 60 may display to users ranking.com rankings for comparison by the user, a trust gauge, a cut-and-paste window, and the ability to sort search results by location (such as "bookstore" as a search term and a zipcode for sorting or proximity to a location).

It is also contemplated that the user be provided with the ability to update or revise their rankings at a subsequent time, after additional experience has been had. As examples, the search engine 20 or the program 60 may provide a link or a pop-up window that facilitates such feedback, and such may also be provided immediately after the user leaves a website that was identified as a link 42 in the search results 40.

In the preferred form, the users who are utilized are selected based on a belief in their honesty. In order to prevent an unscrupulous website operator to shill the website, the users are preferably registered and identified. Validation of the users may include validating contact information, and a requirement of a minimum number of searches completed before the user's results are considered for overall use. Moreover, the user's feedback and activity is compared to the statistical means so outliers are identified. Additionally, an alert system can be implemented that watches a user's feedback to notify engine administrators to check on the user's activity, such as sudden changes to specific search terms or too many changes to specific search terms. The alert system may flag a registered user if multiple searches are run for the same or for similar search terms; the user repeatedly selecting the same result.

Users may be incentivized. While much of the technology community is collaborative and somewhat altruistic, it is believed that the possibility of a personal benefit to users may assist in producing a better search engine 20. That is, providing either a pecuniary reward or a chance at a giveaway is believed to encourage people to be responsible and diligent in providing the feedback to the engine 20.

On the other hand, users may also be charged for using the engine 20. That is, while casual search users may not be interested, there are many search users with tremendous demand on search engines and who spend their entire days running search queries. These power-searchers need greater efficiency and would likely pay a fee for the opportunity to use the engine 20 as it has already improved the search results, thus reducing wasted time for the power-searcher.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A web-based computer search engine system for receiving a search query from a user at a remote computer and returning a search results webpage, the system comprising:
    an input for receiving the search query from the user displayable on the remote computer;
    a processor for processing the search query and for causing the results webpage to be transmitted to the remote computer in response to the search query, the results webpage including respective links to, and respective website information relating to the content of, websites responsive to the search query;
    a non-transitory computer-readable recording medium for storing the website information; and
    a feedback input displayable on the remote computer and adapted to receive a first feedback from the user relating to a perceived relevance of the website information included in the search results webpage relative to the search query, and further adapted to receive a second feedback from the user relating to a perceived relevance of at least one of the websites visited by the user relative to the search query, the second user feedback received after the user visits the at least one of the websites, wherein the processor is adapted to receive the first and second feedbacks and is further adapted to amend the website information at least in part based on the first and second feedbacks.

2. The system of claim 1, wherein the computer readable recording medium includes information relating to whether the user has provided a minimum number of first and second feedbacks; and the first and second feedbacks analyzed by the processor when amending the website information include only the first and second feedbacks for the users that have completed the minimum number of entries.

3. The system of claim 1 wherein the first or second feedbacks includes a numerical ranking of relevance.

4. The system of claim 1 wherein the first or second feedbacks includes a comment received from the user.

5. The system of claim 1 wherein the second feedback includes a description of the perceived the relevance of the at least one websites visited by the user relative to the search query.

6. The system of claim 1 wherein the processor is adapted to receive the first and second feedbacks and compare the first or second feedbacks to a feedback received from another user.

7. The system of claim 1, further comprising providing the user a monetary incentive to provide the first and second feedbacks.

8. A method of receiving a search query from a user at a remote computer and returning a search results webpage, the method including the steps of:
  providing an input displayable on the remote computer;
  receiving a search query from the remote computer via the input;
  processing, via a processor, the search query;
  causing the search results webpage to be transmitted to the remote computer in response to the search query, the results webpage including respective links to, and respective website information relating to the content of, websites responsive to the search query;
  storing the website information;
  receiving a first feedback from the user relating to a perceived relevance of the website information included in the search results webpage relative to the search query;
  receiving a second feedback from the user relating to a perceived relevance of at least one of the websites visited by the user relative to the search query, the second user feedback received after the user visits at least one of the websites;
  receiving the first and second feedbacks; and
  amending the website information at least in part based on the first and second feedbacks.

9. The method of claim 8, further comprising aggregating first and second feedbacks received from a plurality of users.

10. The method of claim 8 wherein the step of causing the results webpage to be transmitted to the remote computer includes providing a feedback input displayable on the search results webpage.

11. The method of claim 10 wherein the steps of receiving the first and second user feedbacks include providing a ranking input adapted to receive a numerical ranking, a comment input adapted to receive a text comment, or a relevance input adapted to receive a relevance ranking from the user.

12. The method of claim 8 further comprising the step of aggregating first and second feedbacks from a plurality of users, and amending the website information based on the aggregate of the first and second feedbacks.

13. The method of claim 8, further comprising amending the website information using only the first and second feedbacks provided by users that have provided a predetermined number of first and second feedbacks.

14. The method of claim 8, further comprising providing the user a monetary incentive to provide the first and second feedbacks.

* * * * *